(12) United States Patent
Turner

(10) Patent No.: US 11,203,304 B2
(45) Date of Patent: Dec. 21, 2021

(54) RADIO MOUNT

(71) Applicant: Daystar Products International, Inc., Phoenix, AZ (US)

(72) Inventor: Mark Alan Turner, Tempe, AZ (US)

( * ) Notice: Subject to any disclaimer, the term of this patent is extended or adjusted under 35 U.S.C. 154(b) by 225 days.

(21) Appl. No.: 16/726,239

(22) Filed: Dec. 23, 2019

(65) Prior Publication Data

US 2020/0207280 A1   Jul. 2, 2020

Related U.S. Application Data

(60) Provisional application No. 62/787,228, filed on Dec. 31, 2018.

(51) Int. Cl.
*B60R 11/02*   (2006.01)
*B60R 11/00*   (2006.01)

(52) U.S. Cl.
CPC ... *B60R 11/0205* (2013.01); *B60R 2011/0005* (2013.01)

(58) Field of Classification Search
CPC ......... B60R 11/0205; B60R 2011/0005; B60R 2011/0003; B60R 2011/0007; B60K 2370/81; B60K 2370/822; H02B 1/044
See application file for complete search history.

(56) References Cited

U.S. PATENT DOCUMENTS

| D481,708 | S | 11/2003 | Quilling, II et al. |
| D531,163 | S | 10/2006 | Kaner et al. |
| 7,165,798 | B2 * | 1/2007 | Chamberlain ...... B60R 11/0205 296/37.1 |
| 7,334,761 | B2 * | 2/2008 | Choi ..................... B60K 37/02 248/27.1 |
| D574,799 | S | 8/2008 | Cronmiller et al. |
| D644,621 | S | 9/2011 | Abe |
| D769,237 | S | 10/2016 | Fiore, IV |
| 10,017,122 | B2 | 7/2018 | Hirota et al. |
| 10,053,009 | B2 * | 8/2018 | Kim ..................... H04N 5/2254 |
| 10,076,957 | B2 | 9/2018 | Inagaki et al. |

* cited by examiner

*Primary Examiner* — Anita M King
(74) *Attorney, Agent, or Firm* — Benjamin D. Rotman; Golan Christie Taglia LLP

(57) ABSTRACT

A radio mount includes a front wall; a rear wall; a bottom wall extending between a lower edge of the front wall to a lower edge of the rear wall; a left wall extending between a left edge of the front wall to a left edge of the rear wall; and a right wall extending between the right edge of the front wall to a right edge of the rear wall. An upper edge of the left wall and an upper edge of the right wall has an arcuate shape sized to conform to a portion of a windshield frame of a vehicle. The front wall defines an opening sized to provide access to a radio mounted within the radio mount. The front wall and rear wall may be angled with respect to the bottom wall. The front wall defines a central portion and two lateral portions for receiving switches.

20 Claims, 7 Drawing Sheets

RADIO MOUNT

PRIORITY CLAIM

This application claims the benefit of priority from U.S. Provisional Patent Application No. 62/787,228, filed Dec. 31, 2018, and entitled RADIO MOUNT, which is incorporated herein by reference in its entirety.

FIELD OF THE INVENTION

This invention relates to vehicle mounts, and in particular a vehicle mounting system for a radio.

BACKGROUND OF THE INVENTION

Vehicles used for driving off-road for pleasure and work need the ability of two-way communication, such as provided in a radio. This communication is essential for safety over varying terrain and to be in contact with other vehicles. Vehicles equipped with safety structures and air bags create issues for mounting of the radio. The dash cannot be drilled into or cut because it weakens the vehicle's dash, and similarly with the window. Anything mounted below or on the dash are unsafe due to airbags deployed in an accident.

Accordingly, it would be an advancement in the art to facilitate a more advantageous mounting of a radio within a vehicle.

SUMMARY OF THE INVENTION

In one aspect of the invention, a radio mount includes a front wall; a rear wall; a bottom wall extending between a lower edge of the front wall to a lower edge of the rear wall; a left wall extending between a left edge of the front wall to a left edge of the rear wall; and a right wall extending between the right edge of the front wall to a right edge of the rear wall. An upper edge of the left wall and an upper edge of the right wall may have an arcuate shape sized to conform to a portion of a windshield frame of a vehicle. The front wall defines an opening sized to provide access to a radio mounted within the radio mount.

In some embodiments, the front wall and rear wall are angled with respect to the bottom wall. In some embodiments, the front wall defines a central portion and two lateral portions, the central portion defining the opening, the central portion defining a first angle with respect to the bottom wall and the lateral portions defining a second angle with respect to the bottom wall that is different from the first angle. In some embodiments, the central portion is angled toward the bottom wall and the lateral portions are angled away from the bottom wall. The central portion may be parallel to the rear wall.

In some embodiments, the radio mount includes transition walls extending outwardly from the lateral portions to the central portions, the transition walls being parallel to the left wall and the right wall. The transition walls may each define a slot and an opening in the slot sized to receive a fastener engaging the radio mounted within the radio mount.

In some embodiments, the left wall and the right wall each define angled recesses extending inwardly from the left wall and the right wall, the angled recesses each defining openings at a top end of the angled recesses, the angled recesses being oriented to receive a fastener engaging the windshield frame. The angled recesses may be oriented parallel to the central portion.

In some embodiments, the lateral portions define openings sized to receive snap-fit switches. The rear wall may define a hook for engaging the windshield frame. The bottom wall may define locator tabs extending outwardly therefrom around the cooling vent for positioning the radio within the radio mount.

A corresponding method of installation is also disclosed and claimed.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
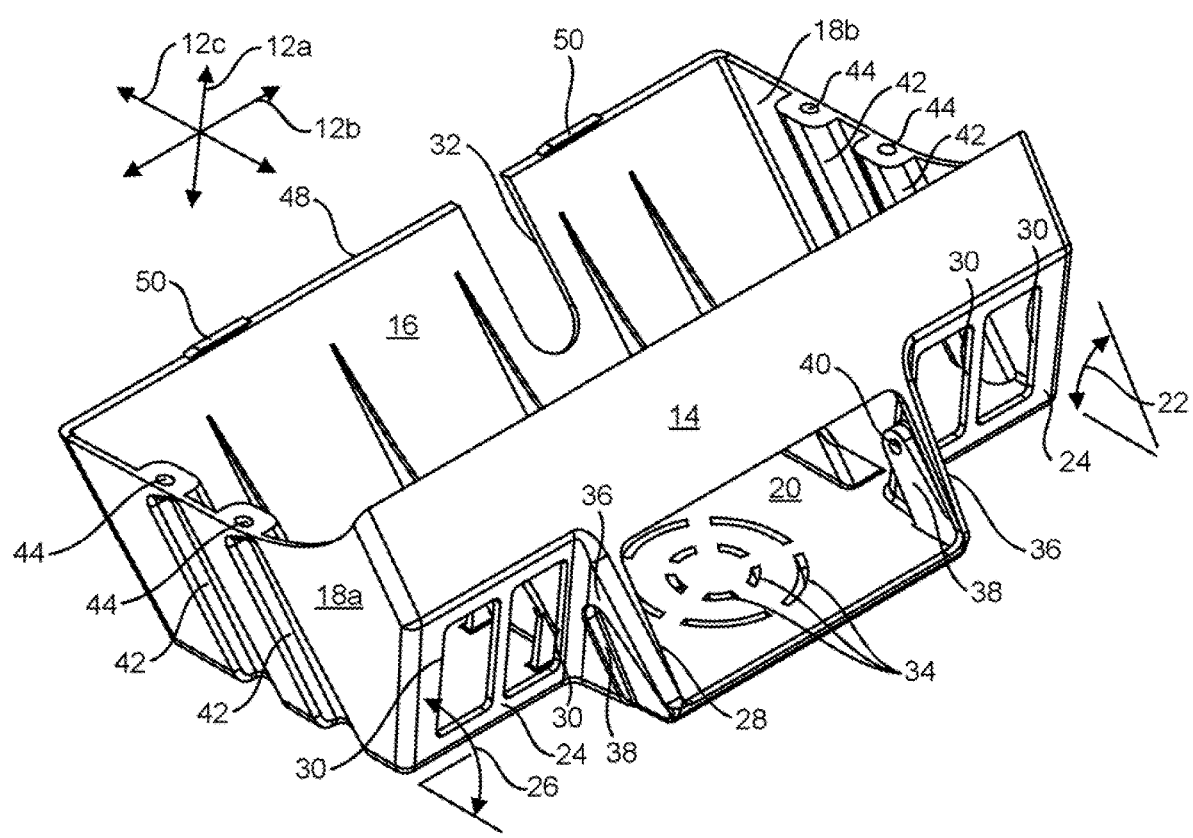
FIG. 1 is an isometric view of a radio mount in accordance with an embodiment of the present invention.
Figure 2:
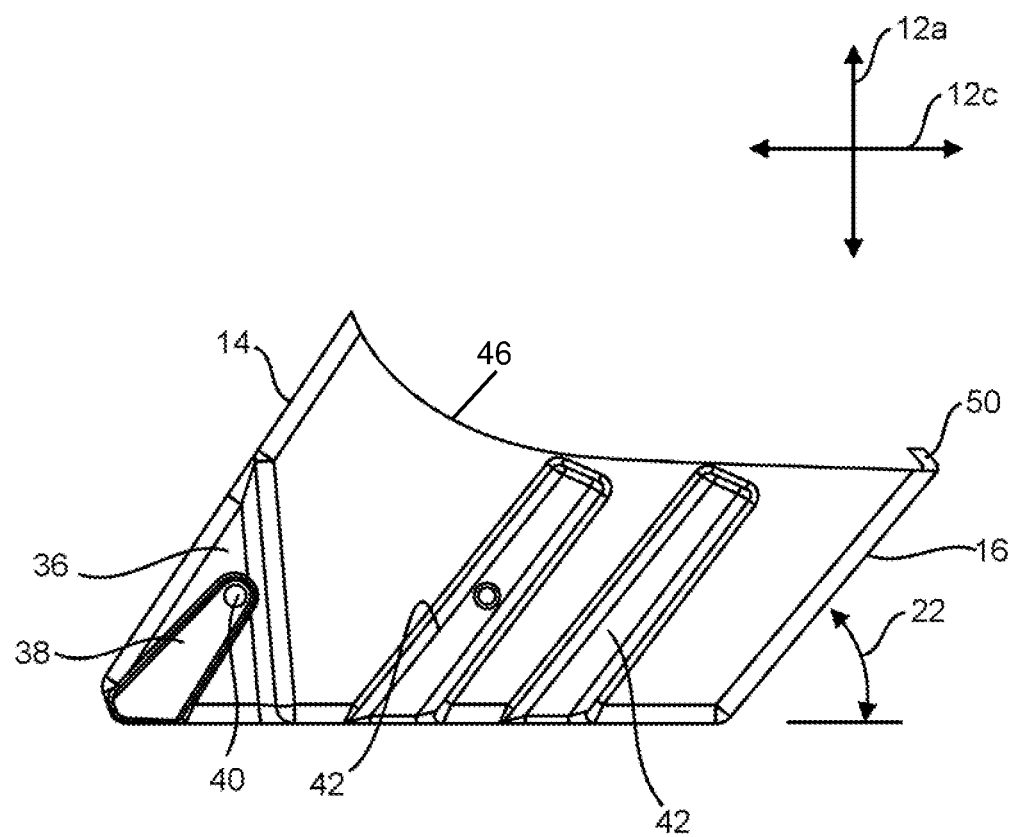
FIG. 2 is a right side view of the radio mount.
Figure 3:
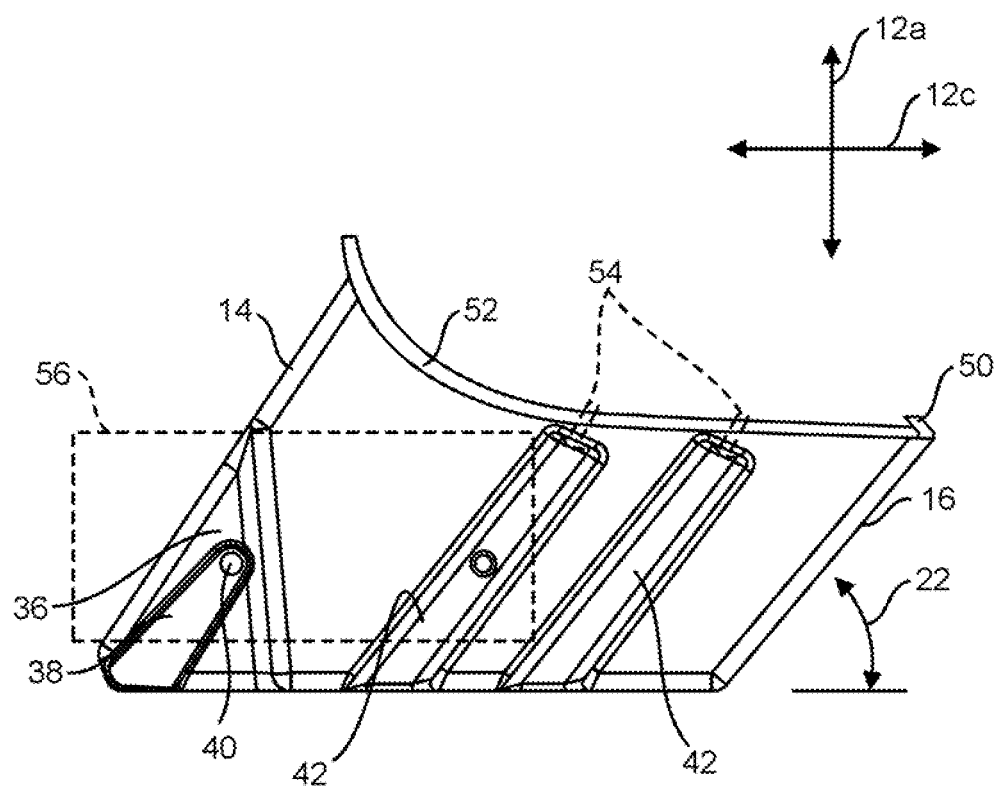
FIG. 3 is a right side view illustrating attachment of the radio mount in accordance with an embodiment of the present invention.

Referring to FIGS. 1, 2 and 3, a radio mount 10 as described below may be understood with respect to a vertical direction 12a, horizontal direction 12b, and a longitudinal direction 12c that are all perpendicular to one another.

The radio mount 10 may include a front wall 14, rear wall 16 opposite the front wall 14, a left wall 18a extending from a left edge of the front wall 14 to the rear wall 16, and a right wall 18b extending from a right edge of the front wall 14 to a right edge of the rear wall 16. A bottom wall 20 connects to bottom edges of the front wall 14, rear wall 16, left wall 18a, and right wall 18b. As is apparent, the walls 14, 16, 18a, 18b, 20 are substantially planar with features formed therein and curved transitions at the connections between adjacent walls 14, 16, 18a, 18b and 20.

The horizontal direction 12b and longitudinal direction 12c may be defined as being parallel to the planar portion of the bottom wall 20 such that the vertical direction is defined as orthogonal to the bottom wall 20. The planar portion of the front wall 14 defines an angle 22 with respect to the bottom wall, such as in a vertical-longitudinal plane parallel to the vertical and longitudinal directions 12a, 12c. As is apparent, the front wall 14 is angled inward toward the bottom wall 20. In the illustrated embodiment, the planar portion of the rear wall 16 is also angled with respect to the bottom wall. For example, the planar portion of the rear wall 16 may be angled outwardly from the bottom wall and may also be substantially (e.g., within 5 degrees of) parallel to the planar portion of the front wall 14.

In the illustrated embodiment, lateral portions 24 having planar portions are located along a portion of the front wall 14 and include planar portions defining angle 26 in the vertical-longitudinal plane that is different from the angle 22 of the front wall 14. In particular, the lateral portions 24 are angled outwardly from the bottom wall and have top edges that intersect portions of the front wall 14 extending above the lateral portions 24.

The front wall 14 defines an opening 28 between the lateral portions 24 that is sized to either (a) provide access to a radio positioned within the radio mount 10 or (b) permit a portion of the radio mounted within the radio mount 10 to protrude outwardly through the opening 28. The lateral portions 24 may define further openings 30. The openings 30 may be used to receive switches. The switches may be any switch known in the art and may be designed to receive snap fit switches that include structures for maintaining themselves within the openings 30 following insertion. The rear wall 16 may define a notch 32 or other opening for receiving cords connected to the radio, such as a power supply cord or a chord cord connected to a hand-held microphone. The bottom wall 20 may define openings 34 for cooling. The openings 34 may be aligned with a vent on a radio mounted within the radio mount 10.

The radio may be fastened with the radio mount 10 by various means. Likewise, the radio mount 10 may be fastened to a vehicle by various means. In the illustrated embodiments, transition walls 36 span between a central portion of the front panel 14 and the lateral portions 24. Planar portions of the transition wall 36 may be substantially parallel to the vertical-longitudinal plane. Openings in the transition walls 36 may receive fasteners passing through the transition walls 36 and engaging the radio. In the illustrated embodiment, recesses 38 are defined in the transition walls and openings 40 for receiving the fasteners are defined on the inner surface of this recess that is parallel to the vertical-longitudinal plane.

The right and left walls 18a, 18b may likewise define openings for receiving fasteners that engage the windshield frame of a vehicle. In the illustrated embodiment, the right and left walls 18a, 18b define recesses 42. The recesses extend inwardly from the walls 18a, 18b and may be angled parallel to the front panel 14, i.e., sides of the recesses perpendicular to the walls 18a, 18b are oriented at angle 22 relative to the bottom wall 20. Recesses 42 may be formed at the top of the recesses 42 such that a fastener may be inserted therethrough to engage the windshield frame of a vehicle.

Figure 5:
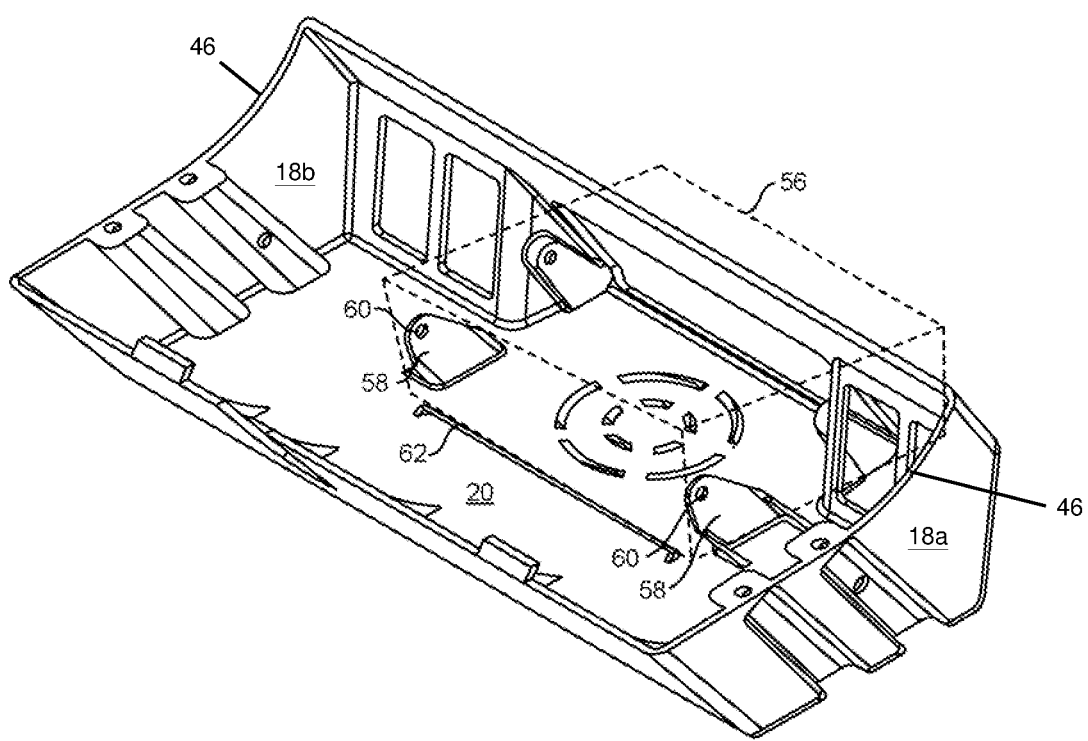
FIG. 5 is an isometric view of the radio mount illustrating mounting of a radio in the radio mount in accordance with an embodiment of the present invention.

The upper edges 46 of the side walls 18a, 18b, as shown in FIGS. 2 and 5, may be curved in the vertical-horizontal plane. In contrast, the upper edges 48 of the front and rear walls 14, 16 may be straight along substantially all (e.g., 80%) of their lengths. However, the rear wall 16 may define one or more hooks 50 that protrude upwardly and inwardly from the upper edge 48 of the rear wall 16 to facilitate securement to the windshield frame of a vehicle.

Referring specifically to FIG. 3, the windshield frame 52 of a vehicle may be curved to substantially conform to the contour of the edges 46, i.e., when in place gaps between the edges 46 and the windshield frame 52 are less than 3 millimeters, preferably less than 1 millimeter.

An edge of the windshield frame 52 seats under the hook 50 to facilitate alignment and to support the radio mount 10. Fasteners such as screws 54 are inserted through the openings 44 and engaged with the windshield frame 52. In some methods of installation, a drill is inserted through the openings 44 to form holes in the frame 52 prior to inserting the screws 54. Note that due to the angle of the recess 42 and the angle of the central axis of the openings 44, the screws are urged to enter the frame 52 at an angle substantially parallel to the angle 22 relative to the bottom wall.

FIG. 3 further illustrates the manner of installation of the radio 56. The radio 56 may be inserted partially through the opening 28 such that a portion of the radio 56 protrudes from the opening 28. In other embodiments, the radio 56 may be placed in the radio mount through the top such that the front of the radio is accessible through the opening 28. Once in place, the radio 56 may be fastened in place using fasteners inserted through the openings 40 defined in the transition walls 36 and engaged with openings defined by the radio 56, such as threaded openings for receiving screws.

Figure 4:
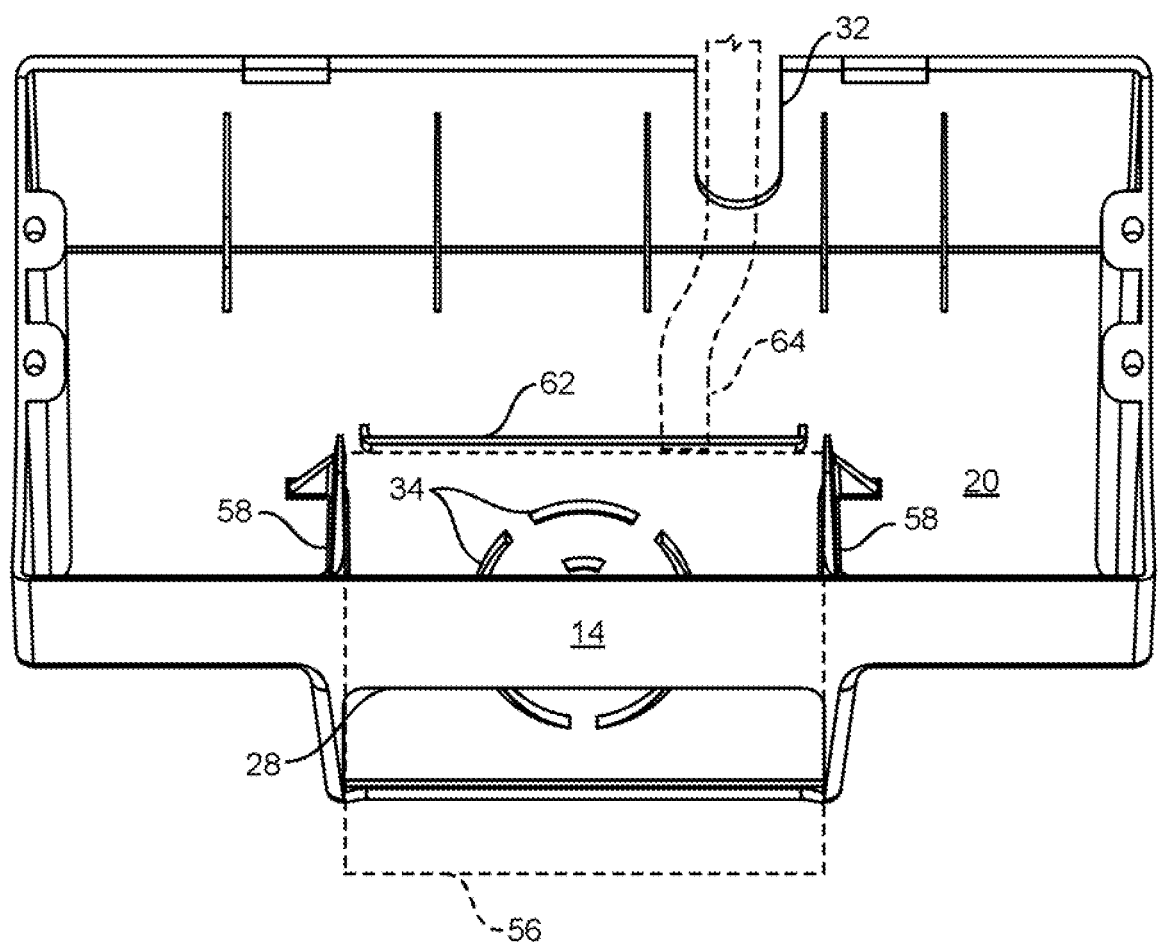
FIG. 4 is a top view of the radio mount illustrating mounting of a radio in the radio mount in accordance with an embodiment of the present invention.

Referring to FIGS. 4 and 5, structures may secure to the bottom wall 20 to facilitate alignment and securement of the radio 56 within the radio mount 10. For example, locator tabs appearing as lateral stops 58 and longitudinal stop 62 extend outwardly from the bottom wall 20 around the vent openings 34 for positioning the radio within the radio mount. Lateral stops 58 may define surfaces extending substantially parallel to the longitudinal direction 12c and engage right and left sides of the radio 56 to align the radio 56 in the horizontal direction 12b. The stops 58 may further define openings 60 for receiving fasteners engaged with the radio 56 in order to further secure the radio 56. A longitudinal stop 62 may define a surface extending substantially parallel to the horizontal direction 12b and engage a rear surface of the radio 10 to align the radio 56 in the longitudinal direction 12c. When in place a cord 64 of the radio and any other cables (such as a microphone cable, antenna cable, or the like) may connect to the radio 10 and extend out through the opening 32.

As is apparent in FIGS. 4 and 5, the radio 56 is positioned over the vent openings 34. The radio 56 may define one or more openings that are positioned over the vent openings when installed as shown in order to facilitate cooling of the radio 56.

Figure 6:
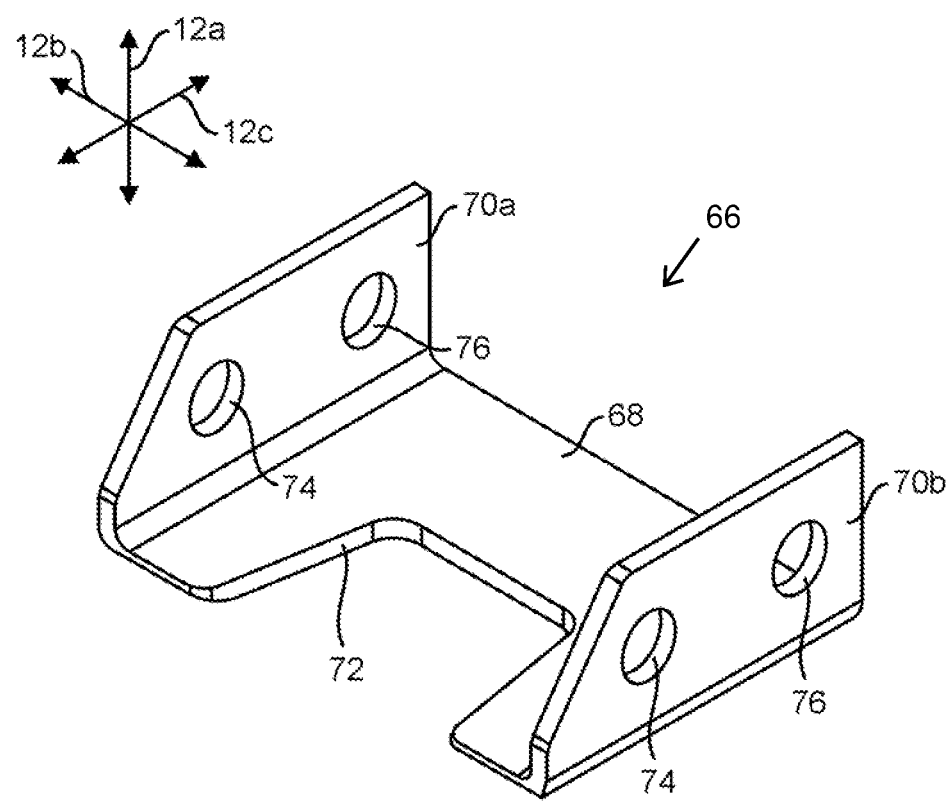
FIG. 6 is an isometric view of an adapter for a radio mount in accordance with an embodiment of the present invention.

Referring to FIG. 6, in some embodiments, an adapter 66 may be used in combination with the radio mount 10 in order to accommodate a radio 56 whose dimensions do not match the dimensions of the interior of the radio mount 10, such as the distance in the horizontal direction 12b between the recesses 38 of the transition walls 36, the separation between the lateral stops 58, or other dimension of the interior of the radio mount 10.

The adapter 66 may include a bottom wall 68 parallel to the horizontal and longitudinal directions 12b, 12c when installed and side walls 70a, 70b that are parallel to the vertical and horizontal directions 12a, 12b when in use. There may be curved transitions between the walls 68, 70a, 70b. The bottom wall 68 may define a notch 72. The notch 72 may be positioned over the vent openings 34 in use in order to enable airflow to and from the radio 56. The side walls 70a, 70b may define one or more openings 74, 76. The openings 74, 76 may receive fasteners for securing the adapter 66 to the radio 56 or for securing the adapter to the radio mount 10. For example, a first opening of the openings 74, 76 may be used to receive a fastener for securing the adapter to the radio mount 10, such as a fastener passing through one of the openings 40. A second of the openings 74, 76 may receive a fastener that also engages a threaded opening in the radio 56. As is apparent in FIG. 6, the front edges of the side walls 70a, 70b may be angled relative to the bottom wall 68. This angle may be the substantially (within 5 degrees) the same as or substantially different from the angle 22 defined by the front wall 14 of the radio mount 10.

Figure 7:
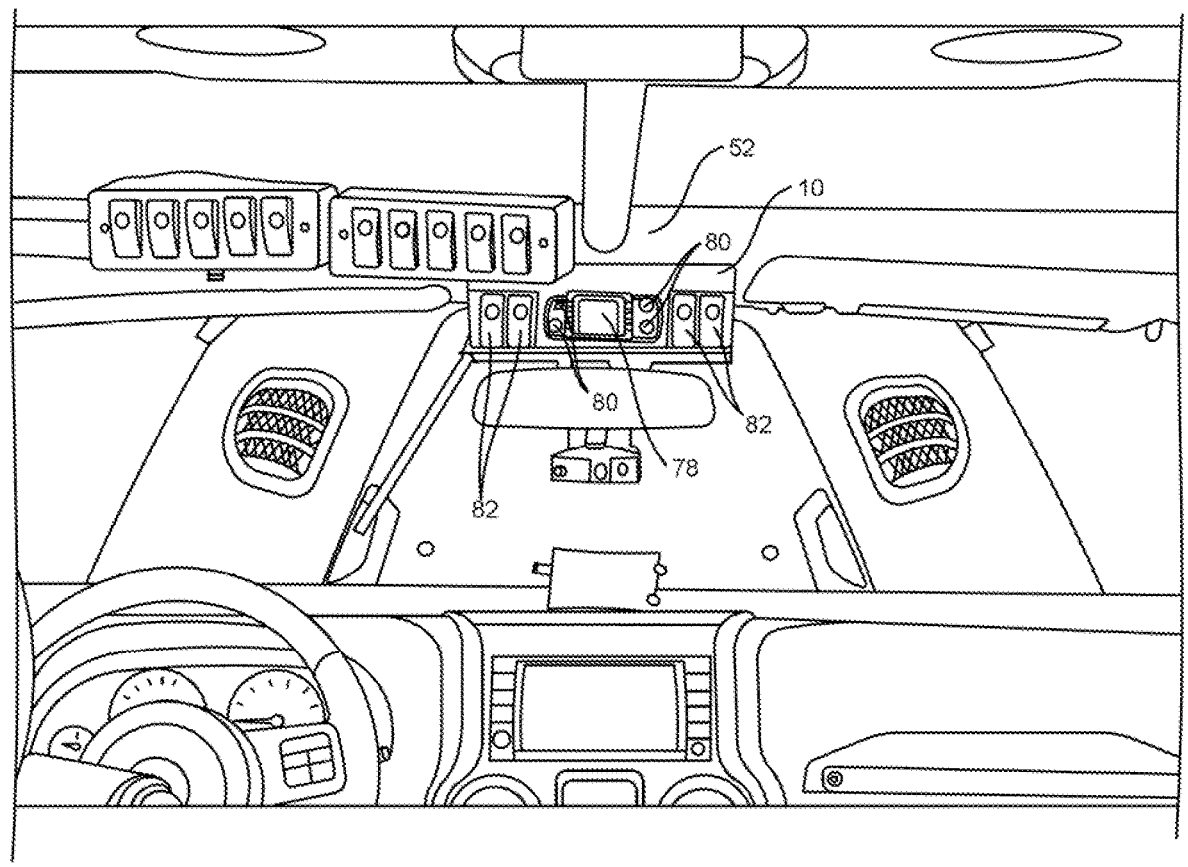
FIG. 7 is perspective view of a vehicle having the radio mount mounted thereto in accordance with an embodiment of the present invention.

FIG. 7 illustrates the radio mount 10 with the radio 56 mounted therein within a vehicle. As is apparent, the radio mount 10 may be mounted to the windshield frame 52 above the rearview mirror. In the illustrated embodiment, the vehicle is an off-road vehicle with a roll bar. In some instances, the windshield frame 52 is itself incorporates a roll bar. The radio 56 mounted within the radio mount 10 provides access to an interface of the radio 10, which may include a screen 78, knobs 80, buttons, or other interface elements known in the art.

FIG. 7 further illustrates switches 82 inserted within the openings 30. The switches 82 may control the operation of the radio 56 and may be coupled thereto by wires. Alternatively, wires emanating from the switches 82 may be routed out of the opening 32 and control other aspects of operation of the vehicle or components mounted to the vehicle.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radio mount comprising:
   a front wall;
   a rear wall;
   a bottom wall extending between a lower edge of the front wall to a lower edge of the rear wall;
   a left wall extending between a left edge of the front wall to a left edge of the rear wall; and
   a right wall extending between a right edge of the front wall to a right edge of the rear wall;
   wherein an upper edge of the left wall and an upper edge of the right wall have an arcuate shape sized to conform to a portion of a windshield frame of a vehicle; and
   wherein the front wall defines an opening sized to provide access to a radio mounted within the radio mount.

2. The radio mount of claim 1, wherein the front wall and rear wall are angled with respect to the bottom wall.

3. The radio mount of claim 2, wherein the front wall defines a central portion and two lateral portions, the central portion defining the opening, the central portion defining a first angle with respect to the bottom wall and the lateral portions defining a second angle with respect to the bottom wall that is different from the first angle.

4. The radio mount of claim 3, wherein the central portion is angled toward the bottom wall and the lateral portions are angled away from the bottom wall.

5. The radio mount of claim 4, further comprising transition walls extending outwardly from the lateral portions to the central portions, the transition walls being parallel to the left wall and the right wall.

6. The radio mount of claim 5, wherein the transition walls each define a slot and an opening in the slot sized to receive a fastener engaging the radio mounted within the radio mount.

7. The radio mount of claim 4, wherein the central portion is parallel to the rear wall.

8. The radio mount of claim 4, wherein the left wall and the right wall each define angled recesses extending inwardly from the left wall and the right wall, the angled recesses each defining openings at a top end of the angled recesses and being oriented to receive a fastener engaging the windshield frame.

9. The radio mount of claim 8, wherein the angled recesses are oriented parallel to the central portion.

10. The radio mount of claim 4, wherein the lateral portions define openings sized to receive snap-fit switches.

11. The radio mount of claim 1, wherein the rear wall defines at least one hook for engaging the windshield frame of the vehicle.

12. The radio mount of claim 11, wherein the bottom wall defines locator tabs extending outwardly therefrom around vent openings forming a cooling vent for positioning the radio within the radio mount.

13. A method comprising:
    providing a radio mount comprising:
       a front wall defining an opening;
       a rear wall;
       a bottom wall extending between a lower edge of the front wall to a lower edge of the rear wall;
       a left wall extending between a left edge of the front wall to a left edge of the rear wall; and
       a right wall extending between a right edge of the front wall to a right edge of the rear wall, an upper edge of the left wall and an upper edge of the right wall have an arcuate shape sized to conform to a portion of a windshield frame of a vehicle;
    mounting a radio within the radio mount such that a front of the radio is accessible through the opening;
    positioning the upper edges of the left wall and the right wall against the windshield frame of the vehicle; and
    fastening the radio mount to the windshield frame.

14. The method of claim 13, wherein the radio protrudes outwardly from the opening.

15. The method of claim 14, wherein the front wall and rear wall are angled with respect to the bottom wall and a front of the radio.

16. The method of claim 15, wherein the front wall defines a central portion and two lateral portions, the central portion defining the opening and a first angle with respect to the bottom wall, and the two lateral portions defining a second angle with respect to the bottom wall that is different from the first angle.

17. The method of claim 16, wherein:
    the lateral portions define openings; and
    the method further comprises mounting switches within the openings.

18. The method of claim 16, wherein the central portion is angled toward the bottom wall and the lateral portions are angled away from the bottom wall.

19. The method of claim 18, further comprising transition walls extending outwardly from the lateral portions to the central portions, the transition walls being parallel to the left wall and the right wall, wherein the transition walls each define a slot and a first opening and wherein the method further comprises inserting first fasteners extending through the first openings of the transition walls in the slot sized and engaging the first fasteners with the radio.

20. The method of claim 19, wherein:
    the left wall and the right wall each define angled recesses extending inwardly from the left wall and the right wall, each angled recess defining a second opening at a top end of the each angled recess; and
    fastening the radio mount to the windshield frame comprises inserting second fasteners through the second openings and engaging the second fasteners with the windshield frame.

* * * * *